United States Patent [19]

Prasad

[11] Patent Number: 4,523,788
[45] Date of Patent: Jun. 18, 1985

[54] LIFT AND DUMP MECHANISM FOR A LAWN DEBRIS COLLECTION BOX

[75] Inventor: Keni K. Prasad, Beaver Dam, Wis.

[73] Assignee: Deere & Company, Moline, Ill.

[21] Appl. No.: 523,248

[22] Filed: Aug. 15, 1983

[51] Int. Cl.³ .............................................. B60P 1/34
[52] U.S. Cl. ................................. 298/11; 298/23 M; 298/17 SG; 414/471
[58] Field of Search .................... 298/11, 23 M, 23 A, 298/23 R, 17 SG, 17 S, 22 C; 414/411, 420, 471

[56] References Cited

U.S. PATENT DOCUMENTS

| | | | |
|---|---|---|---|
| 2,234,599 | 3/1941 | Johnston | 298/11 X |
| 2,626,070 | 1/1953 | Ezell et al. | 414/420 |
| 2,683,544 | 7/1954 | Linde | 414/420 |
| 3,685,674 | 8/1972 | Bruer et al. | 298/11 X |
| 3,744,653 | 7/1973 | Jensen | 414/471 |
| 4,029,357 | 6/1977 | Bishop | 298/11 |
| 4,239,437 | 12/1980 | Naab | 414/411 X |
| 4,447,089 | 5/1984 | Tegtmeier | 298/11 |

Primary Examiner—Joseph E. Valenza
Assistant Examiner—David A. Bucci

[57] ABSTRACT

A lawn debris collection box is mounted, by a slide member, for movement along upwardly and rearwardly inclined guide rods. The box is also mounted so as to pivot upwardly and rearwardly about a connection with the slide member. Also mounted to the slide member for upward and rearward pivotal motion is a pair of drive arms which each have a lost motion connection with the box. A latch arm operative for releasably retaining a hinged lid of the box in a closed position is pivotally connected to the drive arms along with a pair of lift actuators which drive and latch arms to first release the lid, to raise the box until the slide members engage stops at the upper ends of the guide rods and to thus pivot the box to a dump position.

5 Claims, 6 Drawing Figures

LIFT AND DUMP MECHANISM FOR A LAWN DEBRIS COLLECTION BOX

BACKGROUND OF THE INVENTION

The present invention relates to the collection of grass clippings and other debris from lawns and more particularly relates to lift and dump mechanisms for mechanically dumping a collection box.

Commercial lawn care operations require that a large quantity of clippings and other debris be removed from lawns in order to leave them with a well groomed appearance. Common apparatus for collecting such debris include a vacuum assist system for use with a rotary mower for conveying material discharged by the mower to a collection box or a vacuum system operable for picking up debris lying loose on the lawn.

A problem attendant with the collection of a large amount of material is the necessity to somehow efficiently deal with the disposal of the collected material. U.S. Pat. No. 3,744,653 issued on July 10, 1973 addresses this problem and discloses a lift and dump mechanism associated with a collection box so as to enable an operator to dump the collected material into the top of truck boxes or trash bins or to make a high pile of the material on the ground. While the lift and dump function of this patented device is thought to be desirable, the mechanism employed for accomplishing the function is thought to be overly complicated and costly.

SUMMARY OF THE INVENTION

According to the present invention there is provided an improved mechanism for lifting and dumping a lawn debris collection box.

A broad object of the invention is to provide a relatively simple mechanism for mechanically lifting and dumping a lawn debris collection box.

A more specific object of the invention is to provide a mechanism arranged such that one pair of hydraulic actuators operate together to sequentially release a lid latch and then lift and dump the box.

Yet a more specific object is to provide a box pivotally mounted to the tops of a pair of slide members which are received on a pair of upwardly and rearwardly extending guide rods, and a pair of lift actuators connected to a pair of latch levers respectively pivotally connected to the slide members and having a lost motion connection with the box.

These and other objects will become apparent from a reading of the ensuing description together with the appended drawings.

DESCRIPTION OF THE PREFERRED EMBODIMENT

Figure 1:
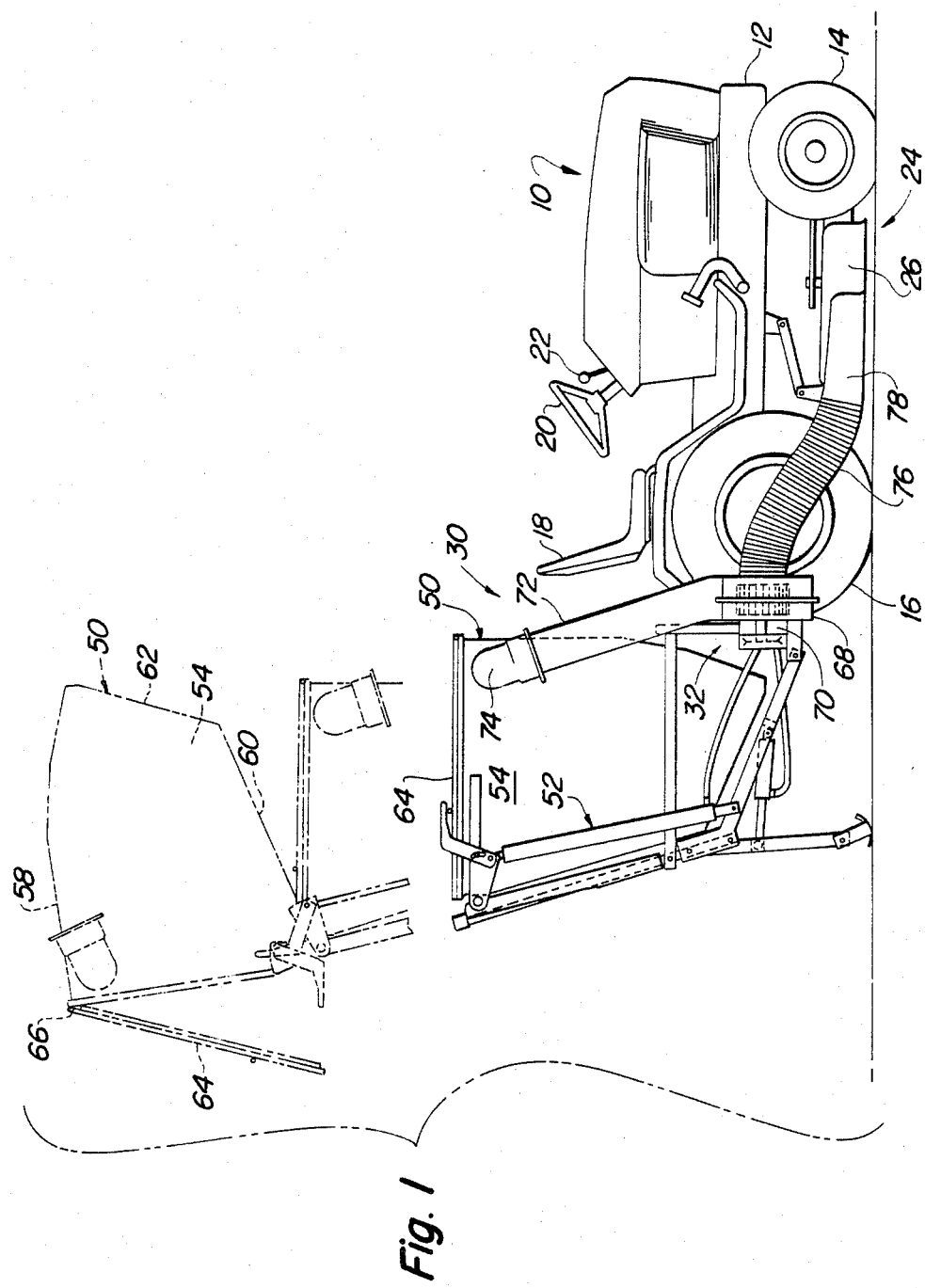
FIG. 1 is a somewhat schematic right side elevational view of a material-collecting system associated with a rotary mower carried by a tractor and including a lift and dump mechanism for a collection box shown in solid lines in a normal fill position, in broken lines in an intermediate lift position and in dashed lines in a dump position.

Referring now to FIG. 1, therein is shown a lawn and garden tractor 10 including a chassis 12 supported on a front pair of wheels 14 and on a rear pair of wheels 16 (only one of each pair being shown). A seat 18 is mounted on the chassis 12 at a location between the rear wheels 16, and located so as to be in easy reach of a seated operator are various controls of which only a steering wheel 20 and a dump control lever 22 are shown here for convenience. Located between the wheels 14 and 16 and suspended from the chassis 12 is a rotary mower 24 having a blade housing 26 defining a discharge opening (not shown) at its right side.

A material-collecting system 30 is carried by the tractor 10 and includes a frame 32 mounted to the rear of the chassis 12. As can best be seen in FIG. 2, the frame 32 includes an upright portion 34 defined by upper and lower, vertically spaced transverse tube members 36 and 38, respectively joined together by right and left vertical end posts 40 and 42 and by right and left posts 44 and 46 respectively spaced inwardly from the posts 40 and 42.

A lawn debris collection box or container 50 is mounted to the frame 32 by a lift and dump mechanism 52. Specifically the box 50 includes right and left sidewalls 54 (only the right side wall being shown), respectively, joined to front, rear and bottom walls 58, 60 and 62, respectively so as to form a receptacle having a rectangular opening at its top. A lid 64 is hinged, as at 66, to a top edge of the front wall 58 and normally occupies a horizontal closed position.

Provided for conveying material to the box 50 is ductwork including a blower 68 supported by a wide channel member 70 projecting rightwardly from and fixed to the upright frame portion 34. The ductwork further includes a tubular outlet portion 72 having a lower end coupled to the blower outlet and having an upper end slidably received in an enlarged end of an elbow section 74 having its opposite end mounted within a circular opening provided in the right sidewall 54 of the box 50. A tubular inlet section 76 of the ductwork has its rear end coupled to the blower inlet and its forward end coupled to a discharge chute 78 fixed to the mower blade housing 26 in material receiving relationship to the discharge opening in the housing.

The lift and dump mechanism 52 is associated with the box 50 for the purpose of enabling an operator to easily unload the box 50 into a large trash container or truck box or the like or onto a pile on the ground. Specifically, the mechanism 52 includes right and left upwardly and rearwardly inclined guide rods 82 and 84, respectively, cantilevered from the upright portion 34 of the frame 32. Specifically, fore-and-aft extending right and left horizontal support members 86 and 88, respectively, have forward end portions received on pins at the opposite ends of the upper transverse tube member 36. The members 86 and 88 have respective rear ends secured to the guide rods 82 and 84. Upwardly and rearwardly inclined support member 90 and 92 are located vertically below the members 86 and 88 and have forward ends received in and bolted to respective clevises fixed to and projecting rearwardly from the lower transverse tube member 38 at the bottoms of the posts 40 and 42. The rear ends of the members 90 and 92 are respectively defined by receptacles 94 and 96 in which the lower ends of the guide rods 82 and 84 are received and bolted in place. The receptacles 94 and 96 are each formed by cooperating pairs of plates. A cross brace 97 interconnects the members 90 and 92 at respective locations intermediate the ends thereof. As will become apparent from the discussion below, the rods 82 and 84 guide the movement of the box 50 and are therefore angled upwardly and rearwardly in general parallellism to the duct outlet portion 72 so that the elbow section 74 will separate from and recapture the upper end of the portion 72 as the box is raised and lowered from its fill position. A slide member 100 is defined by tubular sections 102 and 104 slidably received on the guide rods 82 and 84, by mounting sections 106 and 108, in the form of elongate flat bars, fixed to and projecting upwardly beyond outer surfaces of the tubular sections 102 and 104 and by a horizontal rod 109 having opposite ends projecting through and fixed to the mounting sections 106 and 108. A pair of mounting straps 112 (only the right one being shown) is fixed to and project rearwardly from upper rear corner locations of the box 50 and carry pins 114 at their rear ends, the pins 114 being rotatably received in the mounting sections 106 and 108 at locations forwardly of the rod 109. Provided for lifting and tilting the box 50 is a pair of hydraulic lift actuators 116 and 118 respectively having their cylinder ends pivotally coupled as by pins 120 and 122, to the members 90 and 92 adjacent the rear ends of the latter. A pair of box drive arms 124 (only the right one is shown) is each formed by a pair of spaced parallel triangular plates and have respective first corners pivotally received on the opposite ends of the rod 109. With the box in its fill position, the arms 124 project forwardly from the rod 109 and have respective second corners pivotally coupled, as at pins 132, to the rod ends of the actuators 116 and 118. The drive arms 124 are each provided with an L-shaped opening 135 including a short leg 136 formed arcuately about an axis defined by the rod 109 and a longer leg 138 extending radially relative to the axis. Respective pins 150 are received in the L-shaped openings in the drive arms 124 and are respectively fixed to the right and left sides 54 and 56 of the box 50. Respectively pivotally mounted on the pins 132 and 150 and projecting upwardly and forwardly therefrom are latch arms 154 (only the right one being shown). The latch arms 154 are each provided with a guide opening 158 receiving one of the pins 150 and including forward end portions disposed so as to bear downwardly on pins 160 (only the right one being shown) fixed to the top of and projecting outwardly beyond opposite sides of the lid 64 and in that way keep the lid closed when the lift actuators 116 and 118 are fully retracted and the box 50 in its fill position shown in solid line in FIG. 1. The L-shaped openings 135 permit the actuators 116 and 118 to, upon extension thereof, first release the lid 64 by swinging the latch arms 154 away from the pins 160, this released position being shown in dashed lines in FIG. 1. At this point the pins 150 will be in the bottoms of the short legs 136 of the openings 135 and any further extension of the actuators 116 and 118 will act to lift the box upwardly and rearwardly as guided by the rods 82 and 84. Pinned to the upper ends of the rods 82 and 84 are collars 164 and 166 which are engaged by the tubular sections 102 and 104 of the slide member 100 when the box 50 arrives at its fully raised position shown in dashed lines in FIG. 1. Once the tubular sections 102 and 104 engage the collars 164 and 166, further extension of the actuators 116 and 118 results in the box 50 being pivoted upwardly and rearwardly about the pins 114 to its dump position shown in broken lines in FIG. 1. Because the drive arms 124 swing about a larger radius than does the box 50, the box travels through a greater arc than do the arms so that the contents of the box are dumped.

Figure 2:
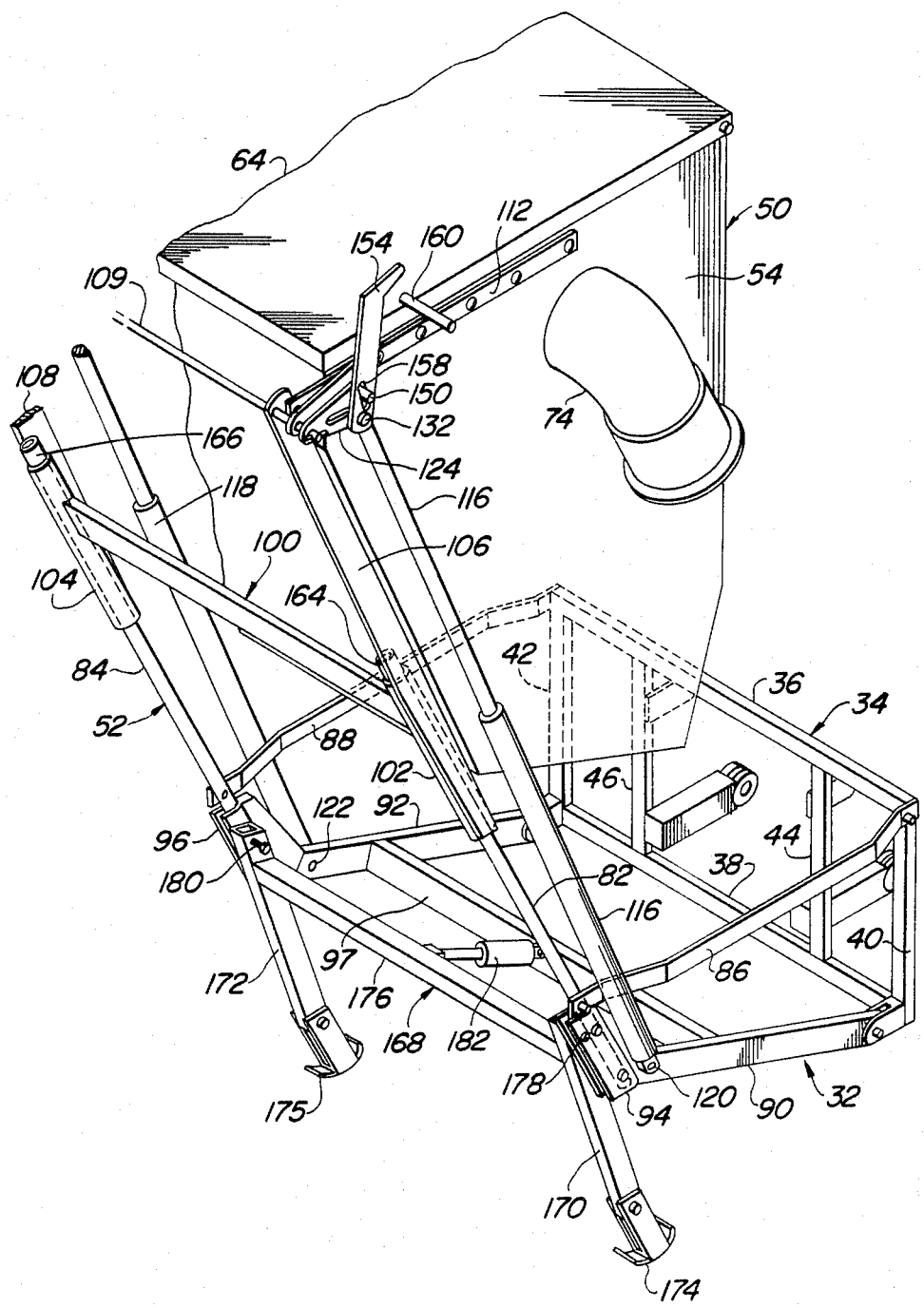
FIG. 2 is a partial right rear perspective view showing the intermediate lift position of the lift and dump mechanism.
Figure 3:
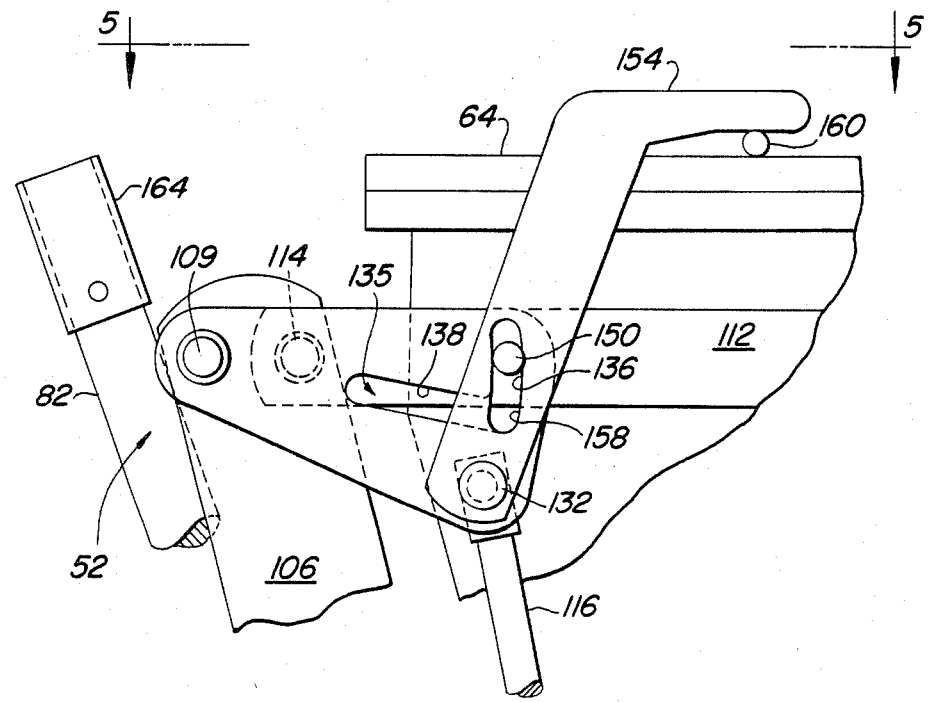
FIGS. 3 and 4 are side elevational views showing the right-hand box lid latch and drive arms, with the drive and latch arms being shown in a fill position in FIG. 3 and in lid-release and box-dump positions in FIG. 4.
Figure 4:
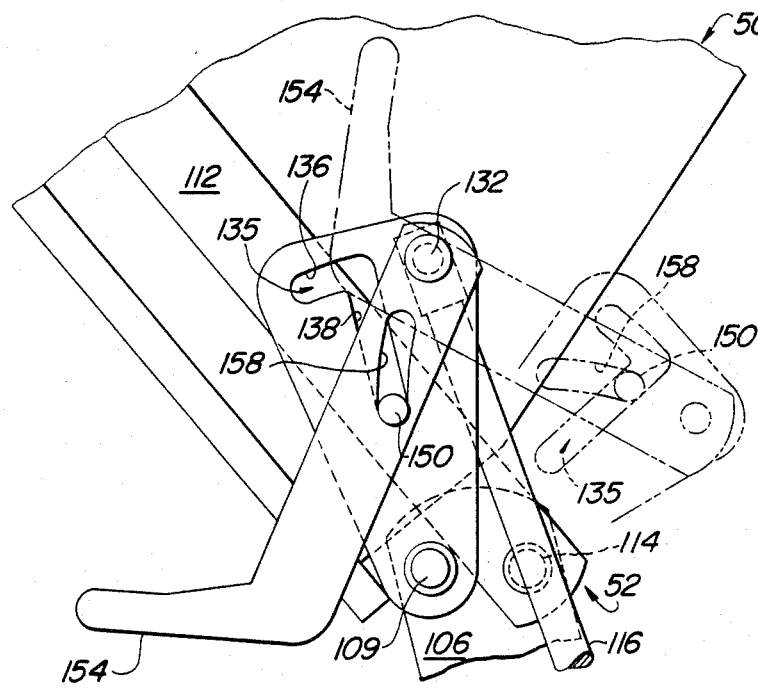

The center of gravity of the box 50 shifts upwardly and rearwardly during the dumping thereof and in order to adequately support the box and to stabilize the frame 32 during the dumping of the box, there is provided a retractable stabilizer 168 (FIG. 2). Specifically, the stabilizer 168 comprises a pair of transversely spaced upright legs 170 and 172 having respective curved ground engaging feet 174 and 175 secured to the bottoms thereof. A horizontal cross brace 176 joins the legs 170 and 172 at locations spaced below upper ends of the legs, the upper ends being positioned inside the lower ends of the guide rods 82 and 84 and being vertically pivotally mounted to the rear ends of the members 90 and 92 by respective pins 178 and 180 which pass through the guide rods. A hydraulic stabilizer actuator 182 is coupled between central locations along the lengths of the cross braces 97 and 176 and acts to move the stabilizer 168 from a stored position wherein the legs 170 and 172 extend alongside the members 90 and 92 and a stabilizing position wherein the legs extend approximately vertically with the feet 174 and 175 being in ground engagement.

Figure 6:
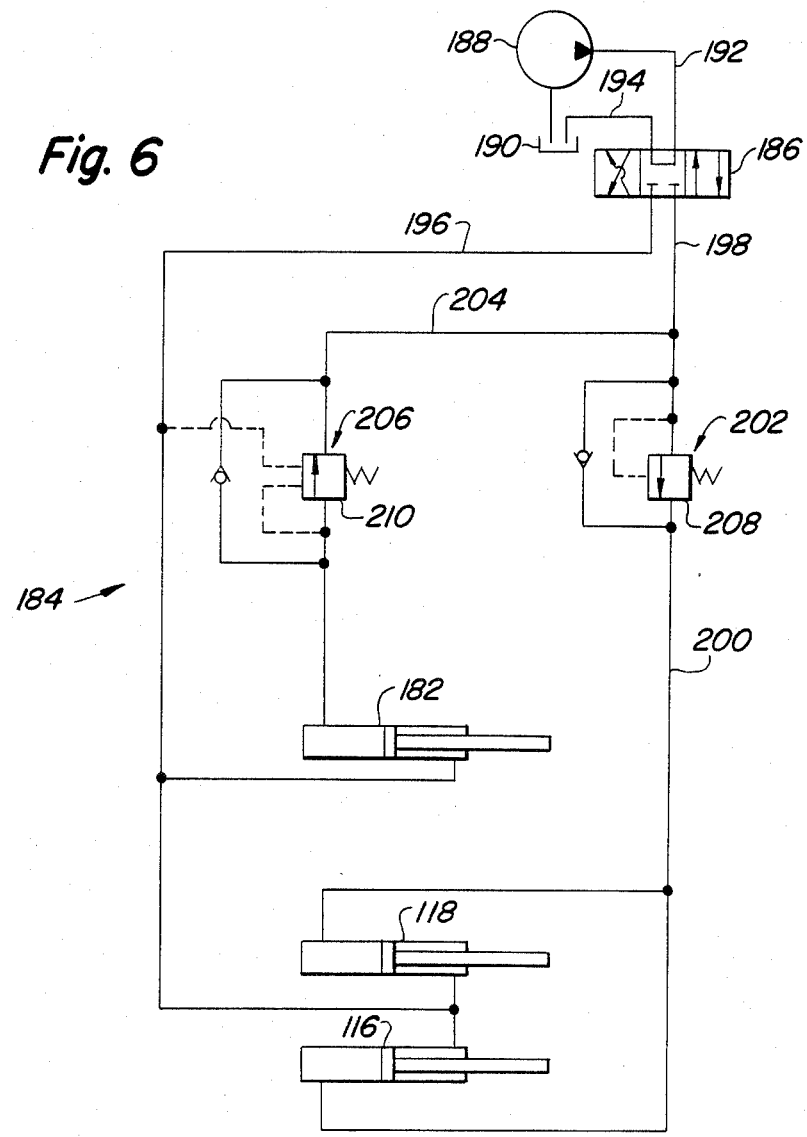
FIG. 6 is a schematic showing of a hydraulic circuit for controlling the flow of fluid to and from the lift and stabilizer actuators.
Figure 5:
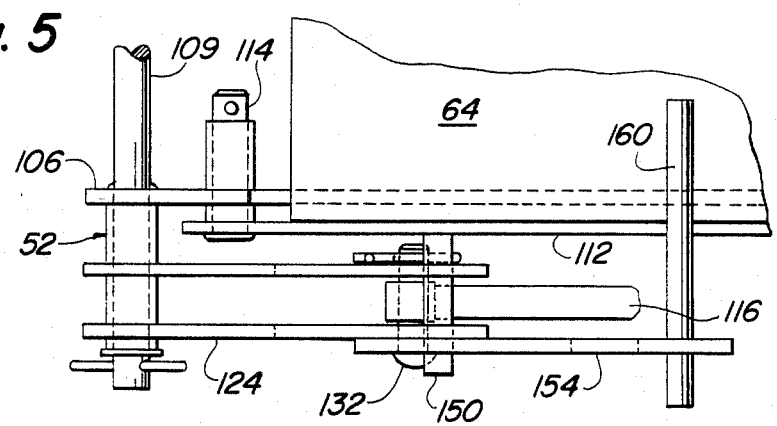
FIG. 5 is a view taken along lines 5—5 on FIG. 3.

Preferably, the lift actuators 116 and 118, and the stabilizer actuator 182 are coupled in a hydraulic circuit 184 (FIG. 6) operative to actuate the actuator 182 to move the stabilizer 168 to its stabilizing position prior to actuating the actuators 116 and 118 to lift the box 50. Specifically, the circuit 184 includes a three-position control valve 186 coupled to a pump 188 and a reservoir 190 by supply and return lines 192 and 194, respectively. A first fluid line 196 couples the valve 186 to the rod ends of each of the actuators 116, 118 and 182. A second fluid line 198 is coupled to the valve 186 and includes a first branch 200 coupled to the head ends of the actuators 116 and 118 by way of a first sequencing valve 202 and a second branch 204 coupled to the head end of the actuator 182 by way of a second sequencing valve 206. The sequencing valve 202 includes an element 208 which is spring biased to a normally closed position and the pressure required for shifting it to an open position permitting fluid to flow to the head ends of the lift actuators 116 and 118 for extending the latter becomes available only after the stabilzer actuator 182 has been fully extended. Similarly, the sequencing valve 206 includes an element 210 which is spring biased to a normally closed position and the pressure required for shifting it to an open position permitting fluid to flow from the head end of the stabilizer actuator 182, so as to permit retraction of the latter, becomes available only after the lift actuators 116 and 118 are fully retracted. It is here noted that the dump control lever 22 would be operatively coupled to the valve 186 so that an operator can effect dumping of the box 50 while remaining seated on the tractor.

I claim:

1. A lift and dump mechanism for a hopper, comprising:
   a support frame adapted for connection to a tractor and including members forming a cradle; a hopper having a lower end received in said cradle when the hopper is in a fill position, said hopper having first and second pairs of opposite upper corners and including a lid hinged for movement about a first horizontal axis located adjacent the first pair of said corners; said support frame including an upwardly and outwardly inclined guide structure located adjacent said hopper at a side opposite from said first horizontal axis and said guide structure including stop means adjacent an upper end thereof; a slide structure mounted for movement along said guide structure and extending in overlapping relationship to a substantial portion of the guide structure when the hopper is in its material receiving position; pivot means vertically pivotally connecting said hopper to an upper end of said slide structure for movement about a second axis extending parallel to the first axis and located adjacent the second pair of said corners; a pair of extensible and retractable hydraulic actuators located at opposite sides of the hopper adjacent said guide structure and having lower ends pivotally connected to said support frame; a pair of drive arms having first ends vertically pivotally connected to the slide structure at an upper location thereof and having second ends respectively pivotally connected to upper ends of the hydraulic actuator; a pair of latch arms respectively mounted to said pair of drive arms and being located for moving alongside areas at opposite sides of said lid; said lid having projections located in the path of movement of said latch arms and being engaged by the latter when the hydraulic actuators are in retracted conditions whereby the lid is held shut; and lost motion connection means connecting said drive arms to said hopper at a location between said first and second axis for permitting a preselected vertical movement of the drive and latch arms relative to the hopper and hence, the lid projections upon initial extension of the hydraulic lift actuators whereby extension of said actuators will first unlatch said lid, then raise the hopper together with the slide structure until the latter engages said stop means and then rotates said hopper about said second axis to dump the hopper contents.

2. The lift and dump mechanism defined in claim 1 wherein said guide structure includes a pair of spaced parallel rods; said stop means comprises a pair of collars received on and fixed to respective upper ends of the pair of rods; and said slide structure including a pair of slide portions respectively slidably received on said pair of rods.

3. The lift and dump mechanism defined in claim 1 wherein said drive arms are in the form of plates and said lost motion connection means including an arcuate opening provided in each plate and a pair of oppositely projecting pins fixed to the opposite side of the hopper and respectively received in the arcuate openings.

4. The lift and dump mechanism defined in claim 3 wherein said drive arms are pivotally connected to the guide members for swinging about a third horizontal transverse axis located rearwardly of said second axis and each of said arcuate openings being arced about said third axis and forming a short leg portion of an L-shaped opening having a long leg extending radially to said third axis whereby the box will move through a greater arc than the drive arms when the actuators are extended.

5. The lift and dump mechanism defined in claim 1 and further including a stabilizer structure pivotally mounted on the support frame for vertical swinging movement between an upward stored position wherein the structure is elevated above the ground and a lowered working position wherein the stabilizer structure engages the ground; a hydraulic stabilizer cylinder connected between the frame and the stabilizer structure for selectively moving the latter between its stored and working positions; and hydraulic circuit means including a source of fluid pressure, direction control and sequencing valve means coupled to said lift and stabilizer actuators and being operative for first supplying fluid to said stabilizer actuator for effecting engagement of the stabilizing structure with the ground and then supplying fluid to said lift actuators.

* * * * *